United States Patent [19]

Hewgill et al.

[11] Patent Number: 4,787,453

[45] Date of Patent: Nov. 29, 1988

[54] PERMEABILITY STABILIZATION IN SUBTERRANEAN FORMATIONS CONTAINING PARTICULATE MATTER

[75] Inventors: Gregory S. Hewgill, Chino; David R. Watkins, Irvine; Leonard J. Kalfayan, Claremont, all of Calif.

[73] Assignee: Union Oil Company of California, Los Angeles, Calif.

[21] Appl. No.: 924,938

[22] Filed: Oct. 30, 1986

[51] Int. Cl.$^4$ .................. C09K 17/00; E21B 43/24; E21B 43/22

[52] U.S. Cl. ................... 166/272; 166/294; 166/295; 166/303; 166/305.1; 106/900; 252/8.514; 252/8.551; 405/264

[58] Field of Search ........... 166/272, 303, 294, 295, 166/305.1, 312, 273, 274, 275; 252/8.551, 8.552, 8.51, 8.514; 405/264; 523/130-132; 106/900

[56] References Cited

U.S. PATENT DOCUMENTS

| | | |
|---|---|---|
| 2,633,919 | 4/1953 | Bauer et al. . |
| 2,816,610 | 12/1957 | Fisher ............................ 166/273 X |
| 2,846,012 | 8/1958 | Lorenz et al. ............... 252/8.554 X |
| 2,935,475 | 5/1960 | Bernard ........................ 252/8.554 X |
| 3,036,630 | 5/1962 | Bernard et al. . |
| 3,282,338 | 11/1966 | Walther et al. ...................... 166/295 |
| 3,285,339 | 11/1966 | Walther et al. ...................... 166/295 |
| 3,286,770 | 11/1966 | Knox et al. . |
| 3,565,176 | 2/1971 | Wittenwyler ................... 166/272 X |
| 3,618,666 | 11/1971 | Sayers ............................ 166/272 X |
| 3,751,371 | 8/1973 | Redmore et al. .............. 252/8.51 X |
| 4,042,032 | 8/1977 | Anderson et al. ............. 166/295 X |
| 4,073,343 | 2/1978 | Harnsberger ....................... 166/295 |
| 4,108,246 | 8/1978 | Jones ............................ 252/8.552 X |
| 4,190,462 | 2/1980 | DeJong et al. .............. 252/8.552 X |
| 4,497,596 | 2/1985 | Borchardt et al. ................... 405/263 |
| 4,498,538 | 2/1985 | Watkins et al. ..................... 166/295 |
| 4,580,633 | 4/1986 | Watkins et al. ................ 166/303 X |
| 4,646,835 | 3/1987 | Watkins et al. ..................... 166/295 |

*Primary Examiner*—George A. Suchfield
*Attorney, Agent, or Firm*—G. Wirzbicki

[57] ABSTRACT

A method for treating a fines-containing formation to prevent the migration and/or swelling of particulate matter. The method comprises injecting into the formation water and/or steam which contains at least one water-soluble organosilicon compound. Suitable compounds include those which are not normally considered to be water-soluble, but which hydrolyze to form water-soluble materials such as silanols.

29 Claims, No Drawings

PERMEABILITY STABILIZATION IN SUBTERRANEAN FORMATIONS CONTAINING PARTICULATE MATTER

INTRODUCTION TO THE INVENTION

This invention relates to the field of treatments which enhance fluid flow through subterranean formations and, more particularly, to treatments for formations which contain fine particulate matter.

In producing or recovering fluids from subterranean formations containing fines, such as silt-sized or smaller particles of siliceous materials, carbonates, oxides, sulfates, and the like, it is often the experience that these very fine particles are subject to movement with the fluid even when the fluid is flowing at a relatively low rate. Where a large volume of fluid is forced to flow through such a particulate-containing formation, the very fine particles tend to be carried along until they become lodged in pore throats, e.g., the smaller interstices between the grains of the formation. This at least partially plugs the openings and reduces the permeability of the formation to fluid flow. A permeability impairment due to the movement of such particles is often a major problem in the operation of fluid injection wells and fluid production wells. Also, certain types of water-sensitive clay fines which can be present in the formation, for example montmorillonite, can swell and decrease the permeability of the formation, if the fluid passing therethrough is or contains water.

Various treatments have been proposed to minimize damage to formation permeability by fine particles. Such treatments have included the injection of zirconium oxychloride to stabilize clays, the conversion of clays from the swelling sodium or lithium form to an ammonium or another cation form which does not swell as much, and the injection of various amines or ydroxyaluminum solutions.

Further, it is known to inject particular organosilanes into subterranean formations as a component of various treating agents for various purposes. Thus, U.S. Pat. No. 3,286,770 to Knox et al. teaches a method for rendering formations preferentially oil-wettable so as to increase the flow rate of water therethrough. The method involves injecting into the formation a treating agent comprising certain organohalosilanes in a water-soluble solvent. The organohalosilane reacts with silica surfaces or sand in the formation to form a polymer and render the formation oil-wettable.

U.S. Pat. NO. 2,633,919 to Bauer et al. describes a method for increasing oil production from a well wherein the formation is first dried, as by heating or injection of a solvent wash such as alcohol. Next, there is injected into the formation a silicone-forming agent, for example, mono-, di-, or tri-alkyl, or -aryl silicon halide, or corresponding ester thereof, to form a solid silicone polymer which is bonded to the surface of the formation.

Bernard et al., in U.S. Pat. No. 3,036,630, describe a treatment to impart water repellency to formations having components which swell or disperse when contacted with water. This treatment involves coating the formation with a silicone polymer or a material which produces a silicone polymer. After treatment, water flooding can be more readily performed.

U.S. Pat. No. 4,498,538 to Watkins et al. is directed to a method for decreasing the movement or swelling of fine particles in a formation, by injecting an organosilane or organosilane ester, preferably in a hydrocarbon carrier liquid.

Each of these references, however, recites the necessity for preventing contact of the treating composition with aqueous materials, before the active ingredients have entered the formation. This limitation precludes use of the methods concurrently with certain other well-treating operations and, therefore, increases the cost and complexity of well treatment and maintenance.

SUMMARY OF THE INVENTION

The invention is a method for treating a fines-containing formation to prevent the migration and/or swelling of particulate matter. The method comprises injecting into the formation water and/or steam which contains at least one water-soluble organosilicon compound. Suitable compounds include those which are not normally considered to be water-soluble, but which hydrolyze to form water-soluble materials such as silanols.

DETAILED DESCRIPTION OF THE INVENTION

For purposes of the present invention, "formation fines" are considered to be particles small enough to pass through openings of the smallest sieve commonly available (400 U.S. Mesh, or 37 micron openings). The composition of the fine particulates can be widely varied, as there are many different materials present in subterranean formations. Broadly, fines may be classified as being quartz, or other minerals such as: feldspars; muscovite; calcite, dolomite and other carbonate minerals; barite; water-swellable clays, including montmorillonite, beidellite, nontronite, saponite, hectorite and sauconite (with montmorillonite being the clay material most commonly encountered); non-water-swellable clays, including kaolinite and illite; and amorphous materials. Fines are present to some extent in most sandstones, shales, limestones, dolomites, and the like. Problems associated with the presence of fines are often most pronounced in sandstone-containing formations.

Broadly stated, the invention is a method for treating a subterranean formation, by injecting into the formation an aqueous composition which contains at least one water-soluble organosilicon compound.

Suitable water-soluble organosilicon compounds for the invention include, without limitation, amino silane compounds such as 3-aminopropyltriethoxysilane and N-2-aminoethyl-3-aminopropyltriethoxysilane, and vinyl silane compounds such as vinyl tris(2-methoxyethoxy)silane. However, as discussed by M. R. Rosen, "From Treating Solution to a Filler Surface and Beyond. The Life History of a Silane Coupling Agent," *Journal of Coatings Technology*, Vol. 50, No. 644, pages 70–82 (1978), many organosilicon compounds are water-soluble for prolonged periods of time after they hydrolyze to form silanols. For purposes of the present invention, then, compounds which form water-soluble silanols by hydrolysis will be considered as equivalent to organosilicon compounds which are initially water-soluble.

Among the organosilanes suitable for use in this invention are those having the formula:

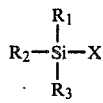

wherein X is a halogen, $R_1$ is an organic radical having from 1 to 50 carbon atoms, and $R_2$ and $R_3$ are the same or different halogens or organic radicals having from 1 to 50 carbon atoms. Preferably, X is a halogen selected from the group consisting of chlorine, bromine, and iodine with chlorine being preferred, $R_1$ is an alkyl, alkenyl, or aryl group having from 1 to 18 carbon atoms and $R_2$ and $R_3$ are the same or different halogens, or alkyl, alkenyl, or aryl groups having from 1 to 18 carbon atoms.

Suitable specific organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

Among the esters of the organosilanes suitable for use in this invention are those having the formula:

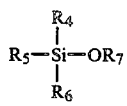

wherein $R_4$, $R_5$, and $R_6$ are independently selected from hydrogen and organic radicals having from 1 to 50 carbon atoms, provided not all of $R_4$, $R_5$, and $R_6$ are hydrogen, and $R_7$ is an organic radical having from 1 to 50 carbon atoms. Preferably, $R_4$, $R_5$, and $R_6$ are independently selected from hydrogen, amine, alkyl, alkenyl, aryl, and carbhydryloxy groups having from 1 to 18 carbon atoms, with at least one of the $R_4$, $R_5$, and $R_6$ groups not being hydrogen, and $R_7$ is selected from amine, alkyl, alkenyl, and aryl groups having from 1 to 18 carbon atoms. When $R_4$, $R_5$, and/or $R_6$ are carbhydryloxy groups, alkoxy groups are preferred.

Suitable specific esters of organosilanes include methyltriethoxysilane, dimethyldiethoxysilane, methyltrimethoxysilane, divinyldimethoxysilane, divinyldi-2-methoxyethoxysilane, di(3-glycidoxypropyl)dimethoxysilane, vinyltriethoxysilane, vinyltris-2-methoxyethoxysilane, 3-glycidoxypropyltrimethoxysilane, 3-methacryloxypropyltrimethoxysilane, 2-(3,3-epoxycyclohexyl)ethyltrimethoxysilane, N-2-aminoethyl-3-propylmethyldimethoxysilane, N-2-aminoethyl-3-propyltrimethoxysilane, N-2-aminoethyl-3-aminopropyltrimethoxysilane, 3-aminopropyltriethoxysilane, and the like.

For purposes of brevity and clarity, the terms "amine," "alkyl," "alkenyl," "aryl," and "carbhydryloxy" have been used above to describe substituents of organosilanes and esters of organosilanes which are useful in the practice of the invention. It is to be understood that these substituents may themselves be substituted or unsubstituted and that each, except for aryl species, may be branched or unbranched.

In the treatment, the organosilicon component can comprise about 0.05 to about 15 percent by weight of the injected aqueous fluid, although, of course, the solubility limit of a component should not be exceeded. Typically, the organosilicon component comprises about 0.25 percent by weight to about 10 percent by weight of the injected fluid.

While the reaction of the organosilicon compound with materials in the formation is not completely understood, and while the invention is not to be held to any single theory of operation, it is believed that the organosilicon compound reacts with active sites on siliceous surfaces, with which it comes in contact, to form a coating. It is believed that an organosilicon compound first hydrolyzes and forms a reactive intermediate, a "silanol," and either an acid or alcohol depending on the type of compound:

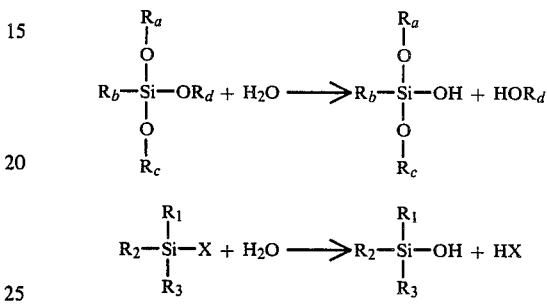

When the organosilicon compound contains two or more halogen atoms or carbhydryloxy groups, the reactive silanols then condense to begin formation of an oligomer or polymer on the rock surface:

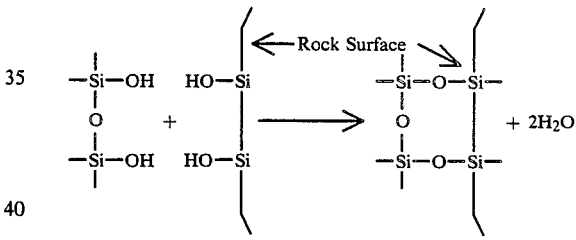

The polymer becomes covalently bonded to any siliceous surface, including clays and the quartz grains which define the pore structure in sandstones or poorly consolidated or unconsolidated formations containing siliceous materials. The polymer acts as a "glue" which coats formation fines and binds them in place, thus reducing their movement when a fluid flows through the formation and decreasing their reactivity toward acids. The polymer also coats water-swellable clays and thereby reduces their subsequent swelling by water-containing fluids.

For practicing the method of the invention, it is sometimes preferred to preflush the formation by injecting hydrocarbon liquid solvents. These liquids, which can include aromatic solvents, are used to dissolve organic materials, such as wax and heavy oil, from mineral surfaces to permit reaction with the organosilicon composition. The liquids may also serve to separate the composition from crude oil, helping to prevent the formation of sludges or emulsions caused by the aqueous-oil interaction. The solvent can also contain a glycol ether compound, usually in concentrations of 5 to 10 percent by volume, to help remove emulsion blocks downhole or to leave mineral surfaces water-wet to aid their reaction with the organosilicon composition. Ethylene glycol monobutyl ether is an example of a compound which can be used. The volume of preflush is typically about 1 to about 500 gallons (3.8 to 1890 liters) per vertical foot (0.305 meter) of formation to be treated.

In addition to the hydrocarbon liquid solvents, or as a replacement therefor, it is sometimes preferred to precede the treatment with organosilicon compounds by a preflush of the formation with an aqueous scale-removal composition. Scale removal can be very beneficial, since fluid injection cannot proceed at maximum rates when openings in the well bore and formation are restricted by deposits of scale. Also, scale which is present in the formation can, if not removed, divert injected treating fluids toward unblocked areas of a formation, resulting in an uneven coverage of a treatment. Volumes of this preflush fluid which are used will be similar to those described for the organic solvent preflush.

In one embodiment of the invention, the treatment is conducted by injecting an aqueous solution of an organosilicon compound (frequently also containing dissolved salts, so that the solution will have approximately the same salinity as that of naturally present waters) through a well into the formation, using pressures sufficient to penetrate the formation. Typical volumes of treatment composition used are about 1 to about 500 gallons (3.8 to 1,890 liters) per vertical foot (0.305 meter) of formation to be treated. Penetration can be improved by following this injection with injecting into the formation an afterflush fluid, typically comprising an aqueous solution of a salt, such as ammonium chloride, or a liquid which is immiscible with the treatment composition, such as a hydrocarbon liquid (crude oil, diesel fuel, kerosene, and the like). The treatment composition itself and afterflushes often contain a glycol ether compound, such as ethylene glycol monobutyl ether. The glycol ether tends to prevent emulsion blocks and to retard adsorption of other treatment additives onto the formation face. However, it does not prevent the reaction of the water-soluble organosilicon compound with the formation. When used in an after flushing fluid, such as a hydrocarbon liquid, the glycol ether can aid in the removal of treatment additives, such as corrosion inhibitors, which may have adsorbed on the formation or could restrict flow of fluid through the formation. The afterflush assists in displacing the treatment composition into the formation, and is typically about 1 to about 500 gallons (3.8 to 1,890 liters) per vertical foot (0.305 meter) of formation to be treated.

The invention can also be used in conjunction with drilling, well completion, or well workover operations, in which the fluids used usually penetrate into subterranean formations. Penetration is caused by maintenance of hydrostatic or other pressures in a wellbore at a higher level than the formation pressure, to prevent blow-outs or other losses of control over the well.

In most cases, the fluids used in such operations are aqueous mixtures of salts (including one or more of sodium chloride, sodium bromide, potassium, chloride, potassium carbonate, ammonium chloride, calcium chloride, calcium bromide, zinc bromide, and many others), optionally including one or more of thickeners (such as cellulose polymrs or xanthan gums), fluid loss agents, thinners, corrosion inhibitors, clay and other mineral additives, and other materials. The fluids also tend to entrain components of various formations encountered as a well is drilled. Formation damage can be caused by the chemical action of aqueous fluid components on formation fines, as well as by the introduction of particulate fluid components (e.g., clays) into the formation. The addition of water-soluble organosilicon compounds to drilling fluids, well completion fluids, kill fluids (which counterbalance formation pressure), and other aqueous fluids assists in preventing formation permeability damage during the above-described operations, and during subsequent routine production from the formation.

As an alternative to these aqueous fluids, the oeprations are sometimes conducted with "oil-based" fluids, which are emulsions typically containing about 10 to about 40 volume percent water. Water-soluble organosilicon compounds can be added to the aqueous phases of such fluids, to achieve benefits similar to those described for aqueous fluids in the event aqueous components enter the formation following breaking of the emulsion or loss of fluid to the formation.

In another embodiment of the invention, which embodiment is particularly useful for treating a formation which contains bitumen, heavy oil, and the like, the organosilicon compound is added to steam and the mixture is injected into the formation.

Steam injection is very commonly used as a method for heating a formation, to decrease the viscosity of hydrocarbons contained therein and increase the rate at which those hydrocarbons can be recovered. In some instances, cyclic injection is used, wherein steam is injected through a well for a first period of time, then injection is terminated and fluids are produced from that well for a second period of time; frequently, these cycles must be repeated on a regular basis to sustain production over a very lengthy time interval. Alternatively, a "steam drive" can be used, wherein steam is injected through one well and thereby pushes hydrocarbons toward other wells, from which the hydrocarbons can be produced.

Steam for injection is produced by boilers or other fuel-fired steam generators, a few types of which operate below the earth's surface, e.g., in a well bore. Most common are "once-through" steam generators, in which water passes through a heatedd tube to vaporize a substantial portion as steam; these generators can better tolerate the dissolved solids found in waters which are available in remote locations, than can boilers. Water fed to the steam generator is converted to dry steam, or to wet steam which contains about 5 to about 95 percent by weight vapor. More typically, mixtures of liquid and vaporized water which contain about 50 percent to about 80 percent vapor are employed; such mixtures are commonly said to have a steam quality of 50 to 80 percent.

For the practice of this invention, organosilicon compounds can be added to the steam generator feedwater or can be added directly to the produced steam at some point prior to contact of the steam with the formation to be treated.

It is expected that well treatments according to the present invention will be of considerable benefit for recently completed walls in formations which are known to give problems from fines migration and/or clay swelling. Such wells can be treated soon after completion (e.g., after a brief production period to clean debris from the perforations and gravel pack, if used) to present future declines in the rate of production. Also, it is frequently necessary to use steam in heavy oil wells, at the onset of production, since the production rate is too low for economical operation of the well; a well may require steam injection for one month to enable economical production for about nine months, after which steam is injected again. By treating the well at an early point in time, it will be possible to avoid most of the potentially permanent formation permeability damage which occurs as pore throats become clogged during normal production.

The invention is further described by the following examples which are illustrative of various aspects of the invention and are not intended as limiting the scope of the invention as defined by the appended claims. In the examples, all percentage composition values are expressed on a weight basis, except as otherwise noted.

EXAMPLE I

An experiment is formed to determine whether an organosilicon compound will enter the liquid phase or the vapor phase of wet steam. In the experiment, a laboratory steam generator (a length of tubing, heated by immersion in an oil bath or by wrapping with a heating tape) produces steam of about 50 percent quality from water pumped therethrough. The water contains 200 milligrams per liter of dissolved sodium bicarbonate, and steam is formed at about 406° F. (208° C.) and 265 p.s.i.a. (17.4 atmospheres). The liquid phase of the steam is isolated, using a sight glass vapor-liquid separator, maintained at approximately the steam temperature, and, after cooling, is found to have a pH about 11.5.

This experiment is repeated with the same feedwater, to which is added 1 percent of 3-aminopropyltriethoxysilane. With this additive, the pH of the feedwater is about 10.6, the pH of condensed steam from the separator is about 10.4, and the pH of the steam liquid phase is about 10.2. Analyses of condensed steam vapor and the steam liquid phase indicate that virtually all of the additive has remained in the liquid phase.

The above-described buffering effect of the additive will assist in avoiding dissolution of siliceous materials in a formation or in a wellbore, by preventing the very alkaline pH values formed by dissolved carbonate species which are present in many natural waters which are used for steam generation. Thus, when used as additives to steam, organosilicon compounds can be expected to prevent formation permeability damage which frequently accompanies steam injection, when siliceous materials dissolve and re-precipitate within a formation.

EXAMPLE II

The extreme sensitivity to water contact of formation materials from the Sespe semiconsolidated sand formation, near Ventura, Calif., is demonstrated by an experiment. Sespe sands contain an average of about 9 percent clay and about 10 to 25 percent silt.

A simulated core is prepared by packing a 1 inch (2.54 cm.) diameter by 3 inches (7.62 cm.) long tube with the loose sand. This tube is mounted in an apparatus which permits fluids to be pumped through the packed sand. The core is treated as follows:
(a) a 3-percent aqueous sodium chloride solution is injected at a pressure about 15 p.s.i.g. (2.0 atmospheres) for about 2 hours; the final flow rate stabilizes at about 1.2 milliliters/minute (ml./min.);
(b) distilled water is injected at the same pressure for about 1 hour, giving a final flow rate about 0.21 ml./min.;
(c) steam, produced from distilled water which contains about 2 grams/liter ammonium carbonate to decrease clay swelling, is injected for 8 hours at 500° F. (260° C.) and 700 p.s.i.g. (48.6 atmospheres);
(d) step (a) is repeated, giving a final flow rate of 1.45 ml./min.; and
(e) step (b) is repeated, giving a final flow rate of 0.18 ml./min.

As can be seen, the steam treatment slightly improved permeability of the sand to a sodium chloride solution, but did not affect the dramatic decrease in permeability resulting from contact with pure water.

EXAMPLE III

A sample of core from the Sespe formation, measuring 1.25 inches (3.18 cm.) long by 0.938 inches (2.38 cm.) in diameter, is mounted in a core holder, saturated with 3 percent aqueous sodium chloride solution, and subjected to a constant 1,000 p.s.i.g. (69.0 atmospheres) confining pressure. A 3-percent aqueous sodium chloride solution is pumped through the core at a constant rate of about 3.2 ml./min., while permeability is indicated by the pressure differential across the length of the core. An initial differential of 157 p.s.i.g. (11.7 atmospheres) indicates a permeability of 3.68 millidarcys (md.), but the pressure steadily increases over about 9 hours to 261 p.s.i.g. (18.8 atmospheres), indicating a final, stable, permeability of 2.08 md.

Following this test, 50 percent quality steam (prepared under the conditions described in preceding Example I, from the aqueous solutions described in Table 1) is passed through the core for a total of 3.5 hours, the steam generator feedwater compositio being changed at intervals, in the sequence shown in Table 1. The permeability test is then repeated using the sodium chloride solution; a stable permeability of 2.08 md. is obtained. Finally, the permeability to distilled water is determined under similar conditions and is found to be stable at 2.11 md.

TABLE 1

| Hours | g/l $(NH_4)_2CO_3$ | Percent 3-ATES* |
|---|---|---|
| 1 | 8 | 1 |
| 1 | 8 | 0.5 |
| 1.5 | 1.6 | 0.5 |

*3-ATES = 3-aminopropyltriethoxysilane

The treatment with steam which contains an organosilicon compound clearly prevents permeability damage from subsequent water contact, as can be seen from a comparison of these results with those of preceding Example II.

EXAMPLE IV

The method of this invention is tested in a heavy oil well which produces from the Sespe formation. A first steam stimulation treatment had been accomplished about one month following the commencement of production, giving a total production about 20 barrels (3,180 liters) per day of which about 14 barrels (2,226 liters) is oil. Within about 3 months, this production has declined to about 7 barrels (1,110 liters) oil per day. A second steam stimulation increases the maximum production rate to 16 barrels (2,544 liters) oil per day, and a maximum monthly average production of 9 barrels (1,430 liters) oil per day, which rate again rapidly declines.

A treatment program is initiated by injecting about 2,500 gallons (9,460 liters) of a 9 percent aqueous solution of disodium ethylenediamine tetraacetic acid, to dissolve calcium-containing scale and to separate calcium-rich formation water from the subsequently injected carbonate-containing steam, thereby preventing further scale precipitation.

Steam injection is commenced, at a rate of about 400 barrels (63,600 liters) steam generator feedwater per day, at pressures about 1,400 to 1,750 p.s.i.g. (96 to 120 atmospheres). Over a total of 20 days, about 2 billion Btu ($2.11 \times 10^{12}$ joule) of heat energy are introduced into the formation. Chemicals are continuously added to the steam through pipe tees, before the steam enters the well tubing. The first day of steam injection, urea is added, in an amount approximately 1 percent of the steam generator feedwater. On the second day, the urea addition is gradually decreased to 0.1 percent over a period of about 1 hour, as the introduction of 3-aminopropyltriethoxysilane (3-ATES) is begun. The 3-ATES is injected in amounts about 1 percent of the steam generator feedwater until about 4,000 gallons (15,140 liters) of feedwater is injected, then is decreased to about 0.5 percent for an additional 13,000 gallons (49,200 liters) of feedwater. Approximately 110 gallons (416 liters) of 3-ATES are used. Beginning on the third day, and continuing throughout the steam injection, urea is added at about 500 milligrams per liter of steam generator feedwater.

Following steam injection, about 1,600 gallons (6,060 liters) of diesel fuel are injected and the well is shut in for a seven-day heat soak period. Production is resumed, at a rate about 14 barrels (2,226 liters) of oil per day, but with a gross production about 40 barrels (6,360 liters) per day.

Enhanced production capability following the treatment is indicated by the high gross production rate. Water which was introduced into the formation as steam will be more completely removed, before the next steam injection cycle.

Various embodiments and modifications of this invention have been described in the foregoing discussion and examples, and further modifications will be apparent to those skilled in the art. Such modifications are included within the scope of the invention as defined by the following claims.

What is claimed is:

1. A method for treating a water-sensitive subterranean formation which contains fine siliceous particulates, comprising injecting into the formation a non-acidic, aqueous composition which contains at least one water-soluble organosilicon compound having only one silicon atom per molecule.

2. The method defined in claim 1, wherein the aqueous composition comprises a drilling fluid.

3. The method defined in claim 1, wherein the aqueous composition comprises a well completion fluid.

4. The method defined in claim 1, wherein the aqueous composition comprises a kill fluid.

5. The method defined in claim 1, wherein the aqueous composition comprises the aqueous component of an oil-based fluid.

6. The method defined in claim 1, wherein the organosilicon compound is selected from the group consisting of organosilicon compounds which can be dissolved in water and organosilicon compounds which hydrolyze in aqueous media to form water-soluble silanols.

7. The method defined in claim 1, wherein the organosilicon compound comprises at least one compound selected from the group consisting of:
(a) an organosilane having the formula:

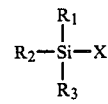

wherein X is a halogen, $R_1$ is an organic radical having from 1 to 50 carbon atoms, and $R_2$ and $R_3$ are the same or different halogens or organic radicals having from 1 to 50 carbon atoms; and
(b) an organosilane ester having the formula:

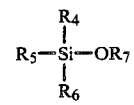

wherein $R_4$, $R_5$, and $R_6$ are independently selected from hydrogen and organic radicals having from 1 to 50 carbon atoms, provided not all of $R_4$, $R_5$, and $R_6$ are hydrogen, and $R_7$ is an organic radical having from 1 to 50 carbon atoms.

8. The method defined in claim 1, wherein the organosilicon compound is selected from the group consisting of amino silanes and vinyl silane compounds.

9. The method defined in claim 1, wherein the organosilicon compound is 3-aminopropyltriethoxysilane.

10. The method defined in claim 1, wherein the injecting is preceded by a preflushing step in which a hydrocarbon liquid is injected into the formation.

11. The method defined in claim 1, wherein the injecting is preceded by a preflushing step in which an aqueous scale-removal composition is injected into a wellbore which penetrates the formation.

12. The method defined in claim 1, wherein the injecting is followed by an afterflush step, in which an aqueous solution or a hydrocarbon liquid is injected into the formation.

13. The method defined in claim 1, wherein the injecting is preceded by at least one preflushing step, in which a hydrocarbon liquid, or an aqueous scale-removal composition, is injected into the formation, and is followed by an afterflush step, in which an aqueous fluid or a hydrocarbon liquid is injected into the formation.

14. A method for treating a subterranean formation which contains fine siliceous particles, comprising injecting into the formation an aqueous composition which contains steam and at least one water-soluble organosilicon compound, the organosilicon compound being capable of binding to said siliceous particles to form a polymer film thereover.

15. The method of claim 14 wherein the concentration of the organosilicon is between about 0.05 and 15 weight percent of the aqueous solution.

16. The method of claim 14 wherein the concentration of the organosilicon is between about 0.25 and 10 weight percent of the aqueous solution.

17. The method of claim 16 wherein the organosilicon compound is selected from the group consisting of organosilicon compounds which can be dissolved in water and organosilicon compounds which hydrolyze in aqueous media to form water-soluble silanols.

18. The method of claim 16 wherein the organosilicon compound is 3-aminopropyltriethoxysilane.

19. A method for treating a subterranean formation which contains siliceous fine particulates, comprising injecting into the formation a mixture of steam and at least one water-soluble organosilicon compound selected from the group consisting of organosilicon compounds which can be dissolved in water and organosilicon compounds which hydrolyze in aqueous media to form water-soluble silanols, said organosilicon compounds being capable of bonding to siliceous particles to form a polymer film thereover.

20. The method defined in claim 19, wherein the organosilicon compound is selected from the group consisting of amino silanes and vinyl silane compounds.

21. The method defined in claim 19, wherein the organosilicon compound is 3-aminopropyltriethoxysilane.

22. The method defined in claim 19, wherein the injecting is preceded by a preflushing step in which a hydrocarbon liquid is injected into the formation.

23. The method defined in claim 19, wherein the injecting is preceded by a preflushing step in which an aqueous scale-removal composition is injected into a wellbore which penetrates the formation.

24. The method defined in claim 19, wherein the injecting is followed by an afterflush step, in which an aqueous solution of a hydrocarbon liquid is injected into the formation.

25. The method defined in claim 19, wherein the injecting is preceded by at least one preflushing step, in which a hydrocarbon liquid, or an aqueous scale-removal composition, is injected into the formation, and is followed by an afterflush step, in which an aqueous fluid or a hydrocarbon liquid is injected into the formation.

26. The method of claim 19 wherein the concentration of the organosilicon is between about 0.05 and 15 weight percent of the aqueous solution.

27. The method of claim 19 wherein the concentration of the organosilicon is between about 0.25 and 10 weight percent of the aqueous solution.

28. A method for treating a subterranean formation which contains fine particulates, comprising sequentially injecting into the formation:
(a) a preflushing composition which is an aqueous scale remover;
(b) an non-acidic, aqueous solution or steam which contains at least one water-soluble organosilicon compound selected from the group consisting of:
(i) an organosilane having the formula:

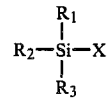

wherein X is a halogen, $R_1$ is an organic radical having from 1 to 50 carbon atoms, and $R_2$ and $R_3$ are the same or different halogens or organic radicals having from 1 to 50 carbon atoms; and
(ii) an organosilane ester having the formula:

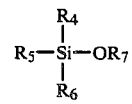

wherein $R_4$, $R_5$, and $R_6$ are independently selected from hydrogen and organic radicals having from 1 to 50 carbon atoms, provided not all of $R_4$, $R_5$, and $R_6$ are hydrogen, and $R_7$ is an organic radical having from 1 to 50 carbon atoms; and
(c) an afterflush compound comprising an aqueous solution or a hydrocarbon liquid.

29. The method defined in claim 28, wherein the organosilicon compound is 3-aminopropyltriethoxysilane.

* * * * *